United States Patent
Woodley et al.

(10) Patent No.: US 11,415,979 B2
(45) Date of Patent: Aug. 16, 2022

(54) CONTROLLING MOVEMENT OF A VEHICLE

(71) Applicant: JAGUAR LAND ROVER LIMITED, Warwickshire (GB)

(72) Inventors: Jonathan Woodley, Coventry (GB); Roxana Ciovnicu, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 156 days.

(21) Appl. No.: 16/481,306

(22) PCT Filed: Dec. 13, 2017

(86) PCT No.: PCT/EP2017/082649
§ 371 (c)(1),
(2) Date: Jul. 26, 2019

(87) PCT Pub. No.: WO2018/137841
PCT Pub. Date: Aug. 2, 2018

(65) Prior Publication Data
US 2020/0064825 A1    Feb. 27, 2020

(30) Foreign Application Priority Data

Jan. 30, 2017  (GB) ..................................... 1701447

(51) Int. Cl.
*G05D 1/00*    (2006.01)
*B60T 7/12*    (2006.01)
(Continued)

(52) U.S. Cl.
CPC .............. *G05D 1/0011* (2013.01); *B60T 7/12* (2013.01); *B62D 15/0285* (2013.01);
(Continued)

(58) Field of Classification Search
CPC .. G05D 1/0011; G05D 1/0016; G05D 1/0033; G05D 1/0038; G05D 1/0044;
(Continued)

(56) References Cited

U.S. PATENT DOCUMENTS 9,168,893 B1    10/2015  Schwartz
2005/0270177 A1  12/2005  Mori et al.
(Continued)

FOREIGN PATENT DOCUMENTS

CN    106094810 A    11/2016
CN    106166993 A    11/2016
(Continued)

OTHER PUBLICATIONS

First review of the opinion notice for CN Application No. 201780084865-2 dated Jan. 20, 2021.
(Continued)

*Primary Examiner* — Russell Frejd
*Assistant Examiner* — Sara J Lewandroski
(74) *Attorney, Agent, or Firm* — Carlson, Gaskey & Olds, P.C.

(57) ABSTRACT

Embodiments of the present invention provide a controller (10) for controlling movement of a vehicle (100), and a corresponding method. The controller (10) comprises processing means configured to: receive (501) a first signal indicative of the vehicle being in a remote control drive mode; receive (502) a second signal indicative of operation of a main input device (124S, 161, 163, 171, 174) within the vehicle (100); and provide (520) an output signal for applying a braking force to slow the vehicle (100) to a stop in dependence on said first and second signals.

16 Claims, 5 Drawing Sheets

(51) Int. Cl.
*B62D 15/02* (2006.01)
*B60W 50/00* (2006.01)

(52) U.S. Cl.
CPC ....... *B60T 2201/02* (2013.01); *B60T 2201/10* (2013.01); *B60W 2050/0073* (2013.01); *G05D 2201/0213* (2013.01)

(58) Field of Classification Search
CPC .. G05D 1/005; B60T 7/16; B60W 2050/0071; B60W 2050/0073
See application file for complete search history.

(56) References Cited

U.S. PATENT DOCUMENTS

| | | | |
|---|---|---|---|
| 2007/0250240 A1* | 10/2007 | Reisner | B60T 7/18 |
| | | | 701/70 |
| 2012/0293316 A1* | 11/2012 | Johnson | E02F 9/2087 |
| | | | 340/438 |
| 2012/0316704 A1 | 12/2012 | Ohbayashi et al. | |
| 2013/0238166 A1* | 9/2013 | Breu | G05D 1/0295 |
| | | | 701/2 |
| 2013/0311004 A1* | 11/2013 | Okamura | G05D 1/0033 |
| | | | 701/2 |
| 2016/0167653 A1* | 6/2016 | Malone | B60W 10/20 |
| | | | 701/23 |
| 2018/0074490 A1* | 3/2018 | Park | G06Q 20/3224 |
| 2018/0126986 A1* | 5/2018 | Kim | B60W 30/12 |

FOREIGN PATENT DOCUMENTS

| | | |
|---|---|---|
| DE | 102005022725 A1 | 11/2006 |
| DE | 102014212274 A1 | 12/2015 |
| EP | 2672354 A1 | 12/2013 |
| WO | 2015/064041 A1 | 5/2015 |
| WO | WO-2016056213 A1 * 4/2016 ............... G08G 1/09 |

OTHER PUBLICATIONS

Combined Search and Examination Report under Sections 17 and 18(3) for Application No. GB1701447.3 dated Jul. 26, 2017.
International Search Report and Written Opinion of the International Searching Authority for International application No. PCT/EP2017/082649 dated Mar. 8, 2018.

* cited by examiner

CONTROLLING MOVEMENT OF A VEHICLE

TECHNICAL FIELD

The present disclosure relates to controlling movement of a vehicle. In particular, but not exclusively, it relates to controlling movement of a road vehicle such as a car in a remote control mode of operation.

Aspects of the invention relate to a method of controlling a vehicle in a remote control drive mode, to a controller for controlling movement of a vehicle, to a vehicle and to a computer program.

BACKGROUND

Suitably equipped vehicles can be operated in a remote control drive mode via a remote device, such as a smart phone having a suitable remote control drive program, to provide convenient means for an operator of the vehicle to control movement of the vehicle from a position outside of the vehicle. This may, for example, be to allow the operator to get a more immediate and encompassing view of the terrain, to allow the operator to carry out a task outside the vehicle, such as opening and subsequently closing a gate across the vehicle's path and manoeuvring the vehicle through the gate, or to park the vehicle—particularly in a restricted space.

Whilst in a remote control mode, the operator would, typically, be outside of the vehicle to enjoy the benefits of the remote control. The operator would therefore not have direct access to any of the main input devices within the vehicle.

It can be envisaged however that in some circumstances one or more of the main input devices may inadvertently be actuated inside the vehicle, for example as the result of a loose piece of equipment or baggage, or by an animal or a person. This could result in unexpected behaviour of the vehicle.

In other circumstances, a person inside the vehicle might want to override the actions of the remote operator.

One problem is therefore how to maximize the safety of the vehicle and people within the vicinity of the vehicle, including the vehicle operator, while the vehicle is being remotely controlled.

It is an aim of embodiments of the invention to address this problem.

SUMMARY OF THE INVENTION

Aspects and embodiments of the invention provide a method of controlling a vehicle in a remote control drive mode, a controller for controlling movement of a vehicle, a vehicle and a computer program as claimed in the appended claims.

According to an aspect, there is provided a method of controlling movement of a vehicle, comprising: receiving a first signal indicative of the vehicle being in a remote control drive mode; receiving a second signal indicative of operation of a main input device within the vehicle; and providing an output signal for applying a braking force to slow the vehicle to a stop in dependence on said first and second signals. Typically, an operator controlling a vehicle in a remote control drive mode is outside of the vehicle, so is not in a position to operate any of the main input devices within the vehicle. Thus, if such an operation is detected, then this can be indicative of a potentially dangerous or unexpected situation occurring within the vehicle. In such circumstances, it is advantageous to bring the vehicle to a stop without requiring any further input from the operator. By doing so automatically, in response to the output signal, this can be achieved faster and in a more controlled manner than by operator intervention. Also, this bypasses the remote control drive apparatus so is not reliant on communications between the remote control device and the braking system of the vehicle.

Once safely stopped, the circumstances which lead to the operation of the main input device can be addressed and operation of the vehicle in remote control drive mode can be resumed safely.

The same principle can be applied to preventing the vehicle from setting off from rest in a remote control drive mode, if there is operation of any of the main input devices within the vehicle. Accordingly, according to another aspect there is provided a method of controlling movement of a vehicle comprising: receiving a first signal indicative of the vehicle being in a remote control drive mode; receiving a second signal indicative of operation of a main input device within the vehicle; and providing an output signal for applying a braking force or for inhibiting an acceleration request signal to prevent the vehicle from setting off from rest in dependence on said first and second signals.

Applying a braking force to slow the vehicle may comprise following a predetermined deceleration profile. This provides the advantage of a predictable, repeatable deceleration, which can assure composure of the vehicle, as opposed to an emergency braking scenario, in which a maximum braking force would be applied. This is advantageous not only from the point of view of comfort for anyone within the vehicle, but also from the point of view of mitigating against, for example, dislodging equipment inside the vehicle. The predetermined deceleration profile may comprise a constant rate of deceleration. This may be a rate of $-0.4$ $ms^{-2}$.

The main input device may comprise a throttle, a gear shifter, a clutch or a cruise control increase set speed button. If this is the case, then an action requested by the second signal is denied. This is because the requested action could, if permitted, lead to the vehicle being accelerated rather than being brought to a stop.

The main input device may instead comprise a steering device, such as a steering wheel. If this is the case, then a steering action requested by the operation of the steering device may be permitted whilst the vehicle is slowed. This is because the requested steering action would not overcome the braking force, so the vehicle would in any event be brought to a controlled stop. However, the requested steering action could well be deliberate, from an occupant of the vehicle, for example to avoid an obstacle. However, in some embodiments, the steering action could instead be denied.

The main input device may instead comprise a service brake or an electronic parking brake. If this is the case, then a braking action requested by the second signal is permitted if the requested braking force exceeds the braking force applied in dependence on the output signal. In this manner, the vehicle may be brought to a more sudden stop than under the automatic controlled deceleration, but this is allowed because it could be a result of deliberate action from an occupant of the vehicle, for example to avoid an obstacle.

In some embodiments, the main input device may comprise a door handle. If operation of the handle is detected, then the vehicle may be brought to a controlled stop.

The method may further comprise applying the parking brake and putting the transmission into park mode after the vehicle has been brought to a stop. The vehicle can thus be placed into a secure and safe state so that the cause of the controlled stop can be investigated and addressed in a safe environment.

According to another aspect, there is provided a controller for controlling movement of a vehicle, the controller comprising processing means configured to: receive a first signal indicative of the vehicle being in a remote control drive mode; receive a second signal indicative of operation of a main input device within the vehicle; and provide an output signal for applying a braking force to slow the vehicle to a stop in dependence on said first and second signals.

According to another aspect of the invention, there is provided a controller for controlling movement of a vehicle, as described above, wherein the processing means comprises an electronic processor having an electrical input for receiving a first signal indicative of the vehicle being in a remote control drive mode, and a second signal indicative of operation of a main input device within the vehicle; and an electronic memory device electrically coupled to the electronic processor and having instructions stored therein; wherein the controller being configured to provide an output signal for applying a braking force to slow the vehicle to a stop in dependence on said first and second signals comprises the processor being configured to access the memory device and execute the instructions stored therein such that it is operable to provide said output signal.

The controller may further comprise a brake controller operably connected to the processor and configured to output a said second signal to the processing means determinative of operation of one or more of a service brake and a parking brake, and, responsive to the output signal from the processing means, to control operation of the vehicle brakes to apply said braking force.

The controller may further comprise a steering controller operably connected to the processing means and configured to output a said second signal to the processing means determinative of operation of a steering device. In an embodiment, the steering device comprises a steering wheel and the steering controller comprises an electric power assisted steering module that is configured to output said second signal in dependence on a predetermined torque having been applied to the steering wheel. The steering controller may be configured to limit any requested steering torque from a remote control device to 3 Nm at the steering wheel in dependence on said predetermined torque having been applied to the steering wheel.

The controller may further comprise a transmission controller operably connected to the processing means and configured to output a said second signal to the processing means determinative of operation of one or more of a gear shifter and a clutch.

The controller may further comprise a powertrain controller operably connected to the processing means and configured to output a said second signal to the processing means determinative of operation of one or more of a throttle and a cruise control increase set speed button.

The brake controller, steering controller, transmission controller and powertrain controller may all comprise separate modules each in operative communication with the processing means, which may itself be comprised in a central control module.

The controller may be configured to carry out the method as described above.

According to yet another aspect, there is provided a vehicle comprising the controller as described above.

According to even yet another aspect, there is provided a computer program which, when executed by a processor, is arranged to perform a method as described above. Optionally, the computer program is stored on a computer-readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only, with reference to the accompanying figures, in which.

DETAILED DESCRIPTION

Figure 1:
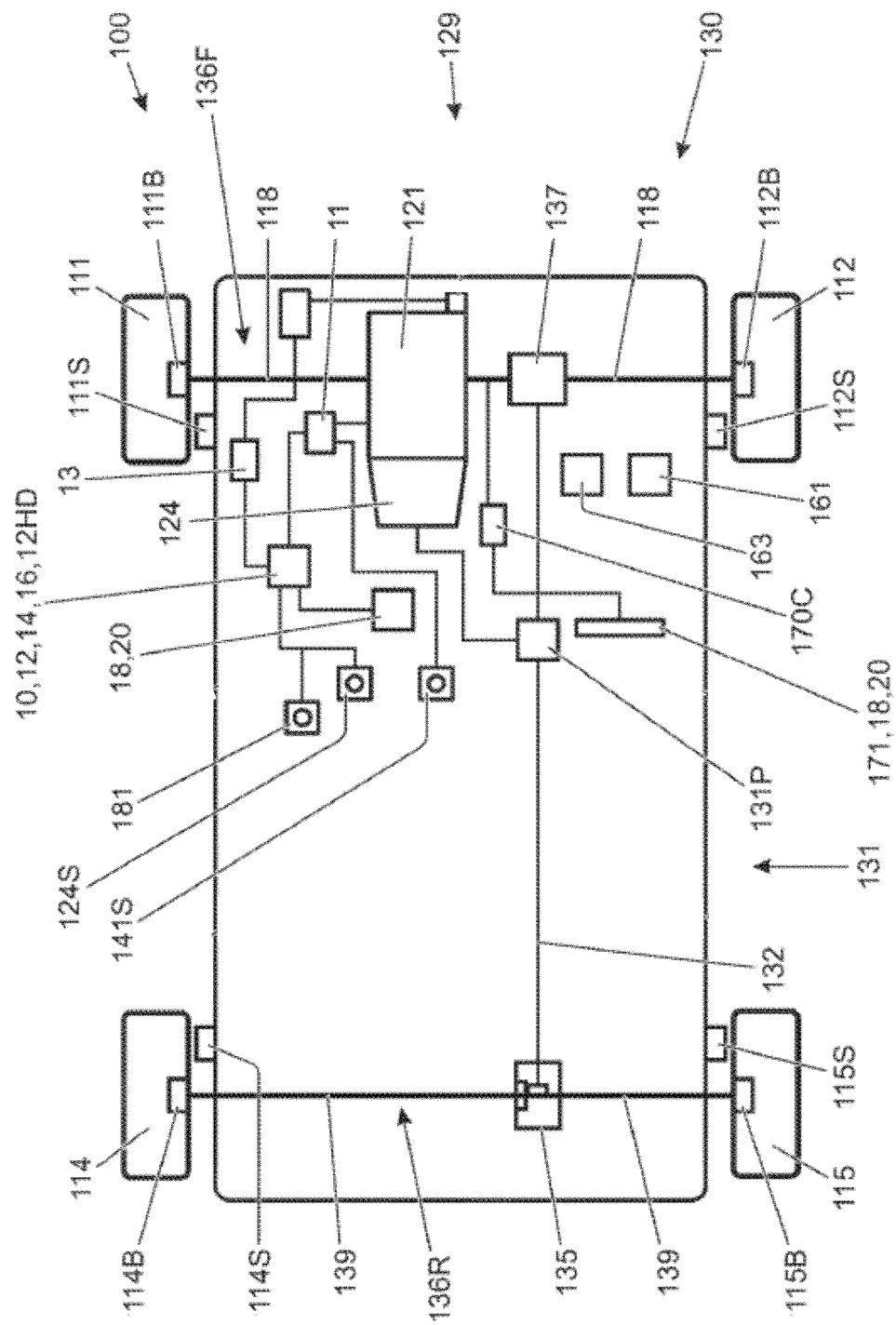
FIG. 1 shows a schematic view of a vehicle suitable for use with a remote control drive system according to the invention.

The figures illustrate a method of controlling movement of a vehicle 100, comprising: receiving 501 a first signal indicative of the vehicle being in a remote control drive mode; receiving 502 a second signal indicative of operation of a main input device 124S, 161, 163, 171, 174 within the vehicle; and providing 520 an output signal for applying a braking force to slow the vehicle 100 to a stop in dependence on said first and second signals.

The figures also illustrate a controller 10 for controlling movement of a vehicle 100, the controller comprising processing means configured to: receive a first signal indicative of the vehicle being in a remote control drive mode; receive a second signal indicative of actuation of a main input device within the vehicle; and provide an output signal for applying a braking force to slow the vehicle 100 to a stop in dependence on said first and second signals.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode P, a reverse mode R, a neutral mode N, a drive mode D or a sport mode S, by means of a transmission mode selector dial 124S. The selector dial 124S provides an output signal to a powertrain controller 11 in response to which the powertrain controller 11 causes the transmission 124 to operate in accordance with the selected transmission mode. Accordingly, in this embodiment a transmission controller (not shown) is incorporated into the powertrain controller 11. However, in other embodiments the transmission controller may be a separate element in operable communication with the controller 10.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are mounted to the vehicle 100 and arranged to measure a speed of the corresponding wheel.

Embodiments of the invention are suitable for use with vehicles in which the transmission is arranged to drive only a pair of front wheels or only a pair of rear wheels (i.e. front wheel drive vehicles or rear wheel drive vehicles) or selectable two-wheel drive/four-wheel drive vehicles. In the embodiment of FIG. 1 the transmission 124 is releasably connectable to the auxiliary driveline portion 131 by means of a power transfer unit (PTU) 131P, allowing operation in a two-wheel drive mode or a four-wheel drive mode. It is to be understood that embodiments of the invention may be suitable for vehicles having more than four wheels or where only two wheels are driven, for example two wheels of a three-wheeled vehicle or four-wheeled vehicle or a vehicle with more than four wheels.

Figure 3:
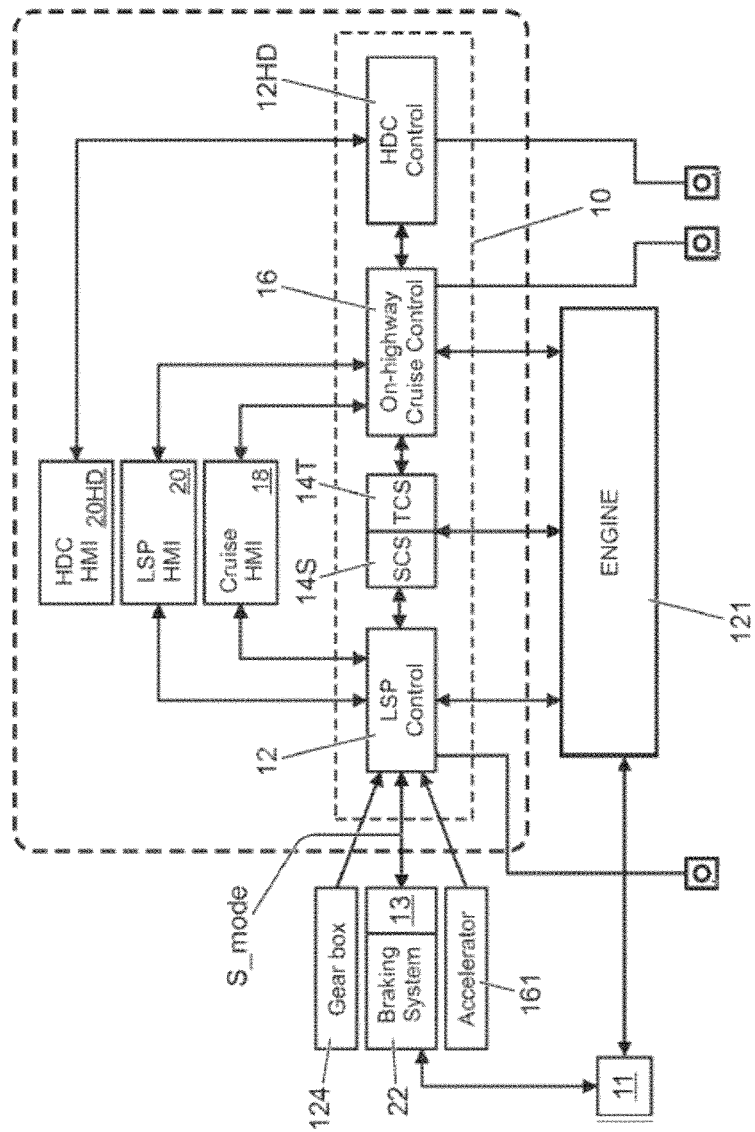
FIG. 3 shows a block diagram of a controller for controlling movement of a vehicle.

A control system for the vehicle 100 includes a central controller 10, referred to as a vehicle control unit (VCU) 10, the powertrain controller 11, a brake controller 13 and a steering controller 170C. The brake controller 13 is an anti-lock braking system (ABS) controller 13 and forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD. The SCS 14S improves stability of the vehicle 100 by detecting and managing loss of traction when cornering. When a reduction in steering control is detected, the SCS 14S is configured automatically to command the brake controller 13 to apply one or more brakes 111B, 112B, 114B, 115B of the vehicle 100 to help to steer the vehicle 100 in the direction the user wishes to travel. If excessive wheel spin is detected, the TCS 14S is configured to reduce wheel spin by application of brake force in combination with a reduction in powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by one or more further controllers.

Similarly, one or more of the controllers 10, 11, 13, 170C may be implemented in software run on a respective one or more computing devices such as one or more electronic control units (ECUs). In some embodiments two or more of the controllers 10, 11, 13, 170C may be implemented in software run on one or more common computing devices. Two or more controllers 10, 11, 13, 170C may be implemented in software in the form of a combined software module.

It is to be understood that one or more computing devices may be configured to permit a plurality of software modules to be run on the same computing device without interference between the modules. For example the computing devices may be configured to allow the modules to run such that if execution of software code embodying a first controller terminates erroneously, or the computing device enters an unintended endless loop in respect of one of the modules, it does not affect execution of software code comprised by a software module embodying a second controller.

It is to be understood that one or more of the controllers 10, 11, 13, 170C may be configured to have substantially no single point failure modes, i.e. one or more of the controllers may have dual or multiple redundancy. It is to be understood that robust partitioning technologies are known for enabling redundancy to be introduced, such as technologies enabling isolation of software modules being executed on a common computing device. It is to be understood that the common computing device will typically comprise at least one microprocessor, optionally a plurality of processors, which may operate in parallel with one another. In some embodiments a monitor may be provided, the monitor being optionally implemented in software code and configured to raise an alert in the event a software module is determined to have malfunctioned.

The SCS 14S, TCS 14T, ABS controller 22C and HDC system 12HD provide outputs indicative of, for example, SCS activity, TCS activity and ABS activity including brake interventions on individual wheels and engine torque requests from the VCU 10 to the engine 121, for example in the event a wheel slip event occurs. Each of the aforementioned events indicate that a wheel slip event has occurred. Other vehicle sub-systems such as a roll stability control system or the like may also be present.

Figure 4:
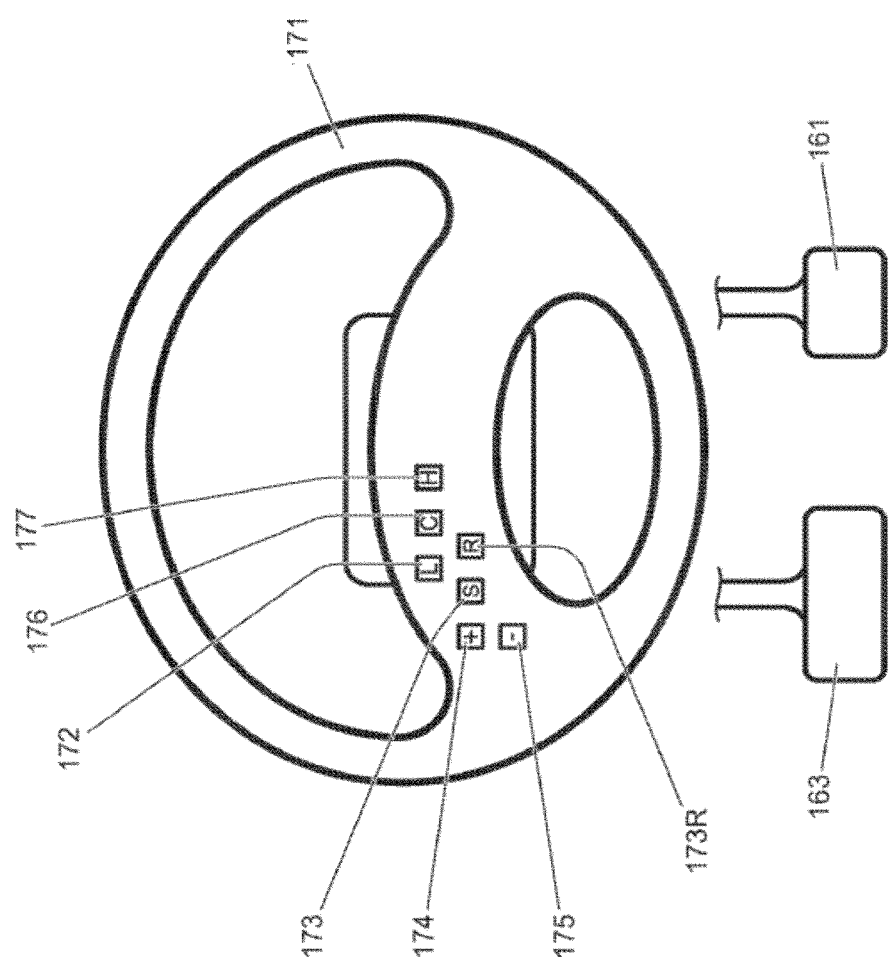
FIG. 4 shows a schematic view of main input devices within the vehicle.

As noted above, the vehicle 100 includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 4). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a cruise control increase set speed button, in the form of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following a driver over-ride intervention. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The LSP control system 12 also provides a speed-based control system for the user, which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed. It is to be understood that in some embodiments the LSP control system selector button 172 may be mounted in a location other than on the steering wheel 171, such as in a dashboard or any other suitable location.

The LSP control system 12 is configured to allow a user to input a desired value of set-speed parameter, user_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of user_set-speed by setting a parameter LSP_set-speed equal to the value of user_set-speed unless the system 12 determines that a lower value of LSP_set-speed is required as discussed in more detail below with respect to FIG. 5. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel, user_set-speed, by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system 12, using the same control buttons 173, 173R, 174, 175. The HDC system 12HD is operable to allow the value of HDC_set-speed to be set to any value in the range from 2-30 kph.

It is to be understood that the VCU 10 is configured to implement a Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode or 'special programs off' (SPO) mode suitable for driving on a relatively hard, smooth driving surface where a relatively high surface coefficient of friction exists between the driving surface and wheels of the vehicle; a 'sand' driving mode (SAND) suitable for driving over sandy terrain; a 'grass, gravel or snow' (GGS) driving mode suitable for driving over grass, gravel or snow, a 'rock crawl' (RC) driving mode suitable for driving slowly over a rocky surface; and a 'mud and ruts' (MR) driving mode suitable for driving in muddy, rutted terrain. Other driving modes may be provided in addition or instead.

The sensors on the vehicle 100 include sensors which provide continuous sensor outputs to the VCU 10, including wheel speed sensors, as mentioned previously and as shown in FIG. 1, and other sensors (not shown) such as an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used. Other sensors may be useful in addition or instead in some embodiments.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

Figure 2:
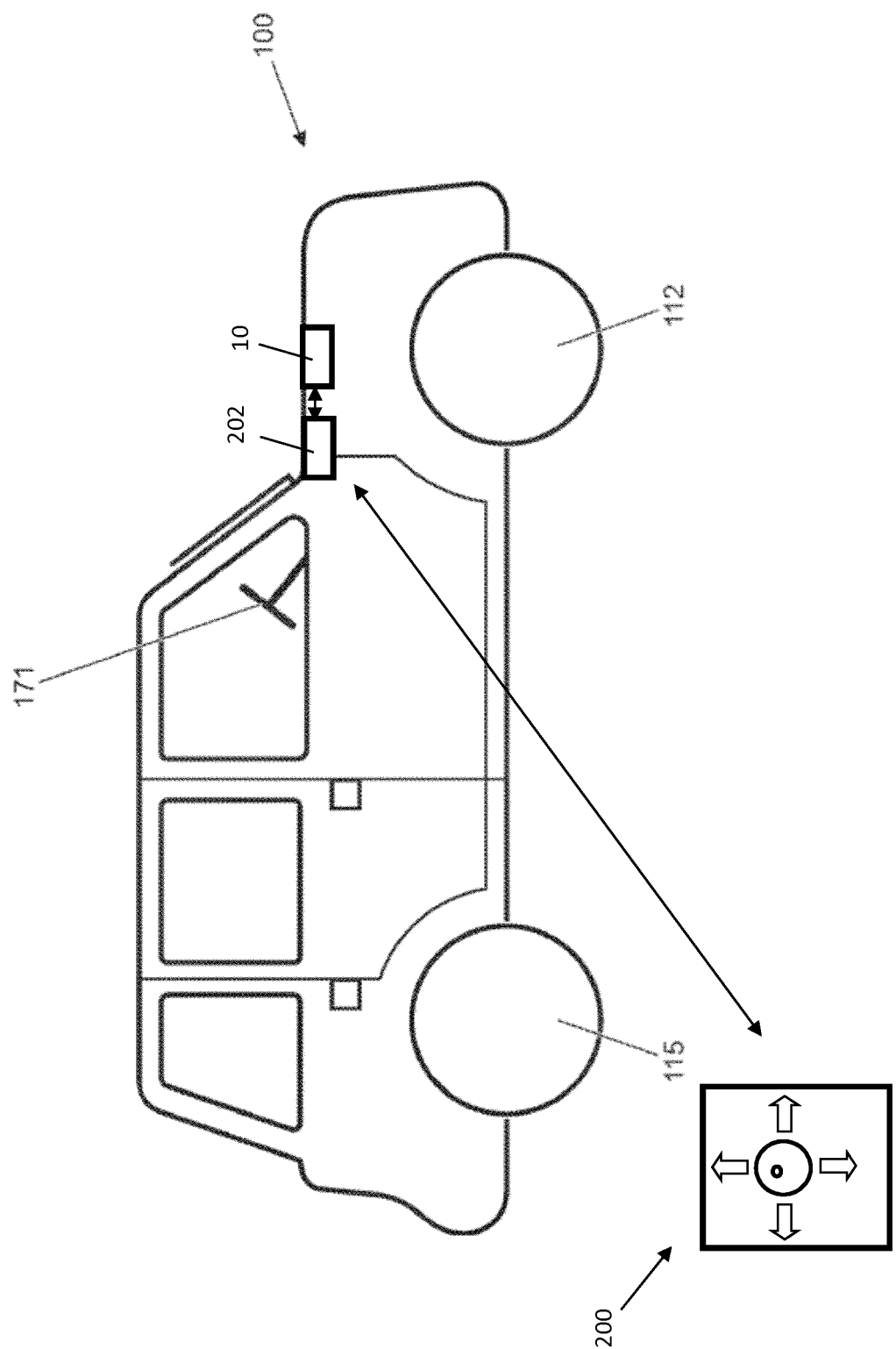
FIG. 2 shows a vehicle and an associated remote control device for use in controlling movement of the vehicle.

As shown in FIG. 2, the controller 10 is configured to receive signals from a receiving means 202 arranged to receive transmitted signals from a remote control device 200 indicating a requested motion of a vehicle.

An example of a system incorporating the apparatus is shown in FIG. 2 within a vehicle 100. The system includes the apparatus of FIG. 1 and a receiving means 202 in the form of a radio unit. The radio unit 202 may comprise a receiver and a transmitter or a transceiver configured to receive radio signals transmitted from a remote control device 200 and transmit signals to the remote control device 200. The radio unit 202 and the remote control device 200 may be arranged to provide a wireless local area network, via which two-way communication may take place between the radio unit 202 and the remote control device 200. For example, the radio unit 202 may be arranged to communicate by WiFi with the remote control device 200. In alternative embodiments other radio communication standards may be used for the communication. In one example, communication between the radio unit 202 and the remote control device 200 is provided via Bluetooth.

The remote control device 200 may be a portable device, which may be carried and used by a person outside of the vehicle 100. In an example, the remote control device 200 comprises a mobile phone (or cell phone) having an application to enable the person to provide manual inputs to request and control movement of the vehicle 100. For example, the manual inputs may include an indication of required throttle and braking, or a required speed, as well as required direction of travel (steering). The remote control device 200 is arranged to include data, indicative of the received user inputs, within the signals transmitted to the radio unit 202. The radio unit 202 is arranged to extract this data and provide the data to the controller 10.

The system further comprises a number of main input devices for affecting progress or movement of the vehicle 100. In the present embodiment, a first main input device comprises a steering wheel 171 arranged to provide steering of the wheels of the vehicle 100 via the steering controller 170C. A second main input device comprises a brake pedal 163 arranged to operate brakes of the vehicle via the brake controller 13.

A third main input device comprises a throttle or accelerator pedal 161 arranged to provide power, or torque, to cause forward or backward movement of the vehicle via the powertrain controller 11. A fourth main input device comprises the set cruise speed increase button 174 arranged, as described above, to increase the value of cruise_set-speed, thereby acting in effect as an accelerator control. A fifth main input device comprises the transmission selector dial 124S or analogous transmission selection devices, such as a gear stick shifter or paddles. In vehicles having a manual transmission, a sixth main input device comprises a clutch pedal (not shown).

The system enables a person to control movements of the vehicle 100 by remote control by providing user inputs to the remote control device 200. To enable such remote control, a two-way communication link is firstly established between the remote control device 200 and the radio unit 202. With the link established, the remote control device 200 may then be used to indicate to the controller 10 that a remote control mode enabling remote control movement of the vehicle 100 is requested. The controller 10 may determine whether one or more criteria are met before enabling remote control of the vehicle. For example, the controller 10 may determine whether a smart key (not shown) is present within the vehicle 100 and if it is, then remote control movement may be disabled or the maximum allowed speed of the vehicle may be set at zero.

With the communication link established, a user of the remote control device 200 is then able to provide manual inputs to the remote control device 200 to request and control movement of the vehicle, including an increase or decrease in speed or power, an increase or decrease in braking, gear selection, and direction of travel (steering). The remote control device 200 may generate data including information defining the requested movement, which is then transmitted to the radio unit 202 via the communication link.

The radio unit 202 determines the data defining the movement requested by the remote control device 200 and provides the data to the controller 10. The controller 10 provides output signals to the power steering controller 170C, the brake controller 13 and the powertrain controller 11 (incorporating the transmission controller) in dependence of the received data, and thus the user is able to operate the vehicle 100 remotely. However, the output signal provided to the brake controller 13 and the powertrain controller 11 may also be dependent upon the maximum speed value mentioned above. Specifically, whatever the speed of vehicle is requested by the remote control device 200, the controller 10 provides output signals to the brake controller 13 and/or the powertrain controller 11 to adjust the speed of the vehicle 100 to be no more than a speed corresponding to the maximum speed value. That is, the speed of the vehicle is limited to be no more than a speed corresponding to the maximum speed value. For example, where the data from the remote control device 202 relates to a user request for increased engine power and/or decreased braking that could increase the speed to 3 kilometres per hour, and the maximum speed value corresponds to 1 kilometre per hour, the controller 10 provides output signals to the brakes and powertrain to cause a speed of only 1 kilometre per hour.

In some instances, the speed requested by the remote control device 200 may be unchanged over a period of time, but the determined maximum speed value may become smaller than the current speed of the vehicle and as a result the output signals to the powertrain controller 11 and/or brake controller 13 may be adjusted to reduce the speed of the vehicle so that it corresponds to the maximum speed value.

Moreover, the requested movement may be overridden in the event that there is actuation of one or more of the main input devices 124S, 161,163, 171, 174 within the vehicle. In other words, remote control device functionality is terminated if an input is detected from one of the main input devices. The input might have to be above a certain threshold value before remote control operation is terminated completely, or remote control operation may be terminated immediately on detection of any level of input from those main input devices.

Upon detection of such an actuation, the controller 10 automatically instructs a braking force to be applied to bring the vehicle 100 to a controlled stop. The braking force may follow a predetermined deceleration profile, which may correspond to a constant rate of deceleration. The controller 10 provides signals to the braking controller 13 to operate the service brakes 111B, 112B, 114B, 115B to apply the required braking force, and provides signals to the powertrain controller 11 to supersede any requested command for power from the remote control device 200. Once the vehicle has been brought to a complete stop, the controller 10 provides signals to the braking controller to apply the electronic parking brake and provides signals to the transmission controller within the powertrain controller 11 to engage the park mode—placing the transmission 124 into park mode P, thereby placing the vehicle 100 in a safe, secure condition.

For a first class of the main input devices, the action requested by the main input device may be permitted. This first class of main input devices comprises the steering wheel 171 (or other analogous mechanisms to request operation of the steering controller 170C, such as a joystick), the service brake pedal 161, and the electronic parking brake. These correspond to main input devices for which an input would not necessarily negatively interfere with the bringing of the vehicle to a controlled stop. Actuation of the steering wheel 171 could have been carried out by an occupant of the vehicle for example to avoid an obstacle that has not been seen by the user of the remote controller 200. In an embodiment, the remote control operation is terminated if a torque of greater than a predetermined amount (of, for example, 3 Nm) is detected at the steering wheel 171. Accordingly, the steering controller 10 may be configured to limit any requested steering torque from the remote control device to 3 Nm at the steering wheel in dependence on said predetermined torque having been applied to the steering wheel 171, so that the steering demand input at the remote device is overridden if a greater demand is made at the steering wheel. In other words, during normal remote control drive mode operation with no input at the steering wheel, the amount of steering torque requested by the remote control device 200 is unrestricted. If, however, an input at the steering wheel 171 is detected, then it is allowed, superseding any steering request from the remote control device 200. If the input at the steering wheel is relatively gentle, then remote control operation can still continue, so other commands such as acceleration or braking in response to requests made at the remote control device 200 are still allowed. If, however, the input at the steering wheel is above the predetermined amount, then all remote control operation is shut down, with the automatic application of the brakes to bring the vehicle 100 to a stop, whilst allowing steering input at the steering wheel 171.

Likewise, the service brake pedal 161 or the electronic parking brake may have been actuated deliberately by an occupant, for example in an emergency braking scenario. Thus, if the braking force requested by actuation of the primary braking actuator 161 is greater than that being applied automatically, then the greater braking force should be applied so as to bring the vehicle to a more sudden stop.

In contrast, for a second class of the main input devices, the requested action is denied. This second class of main input devices comprises the throttle 163, gear shifter 124S, and cruise control increase set speed button 174. These correspond to the actuators for which an input results in a request, via the powertrain controller 11, for an increase in power to be applied to the vehicle drivetrain, thereby potentially resulting in acceleration of the vehicle 100, even during the application of the automatic braking force. The clutch may also be included in this class of main input devices, because operation of the clutch could result in an acceleration of the vehicle 100, due to bypassing engine braking.

The door handles (not shown) may also be considered as main input devices for the purpose of overriding operation of the remote control drive mode on detection of operation of one of the door handles from within the vehicle, since this could indicate the presence of an occupant within the vehicle 100.

Figure 5:
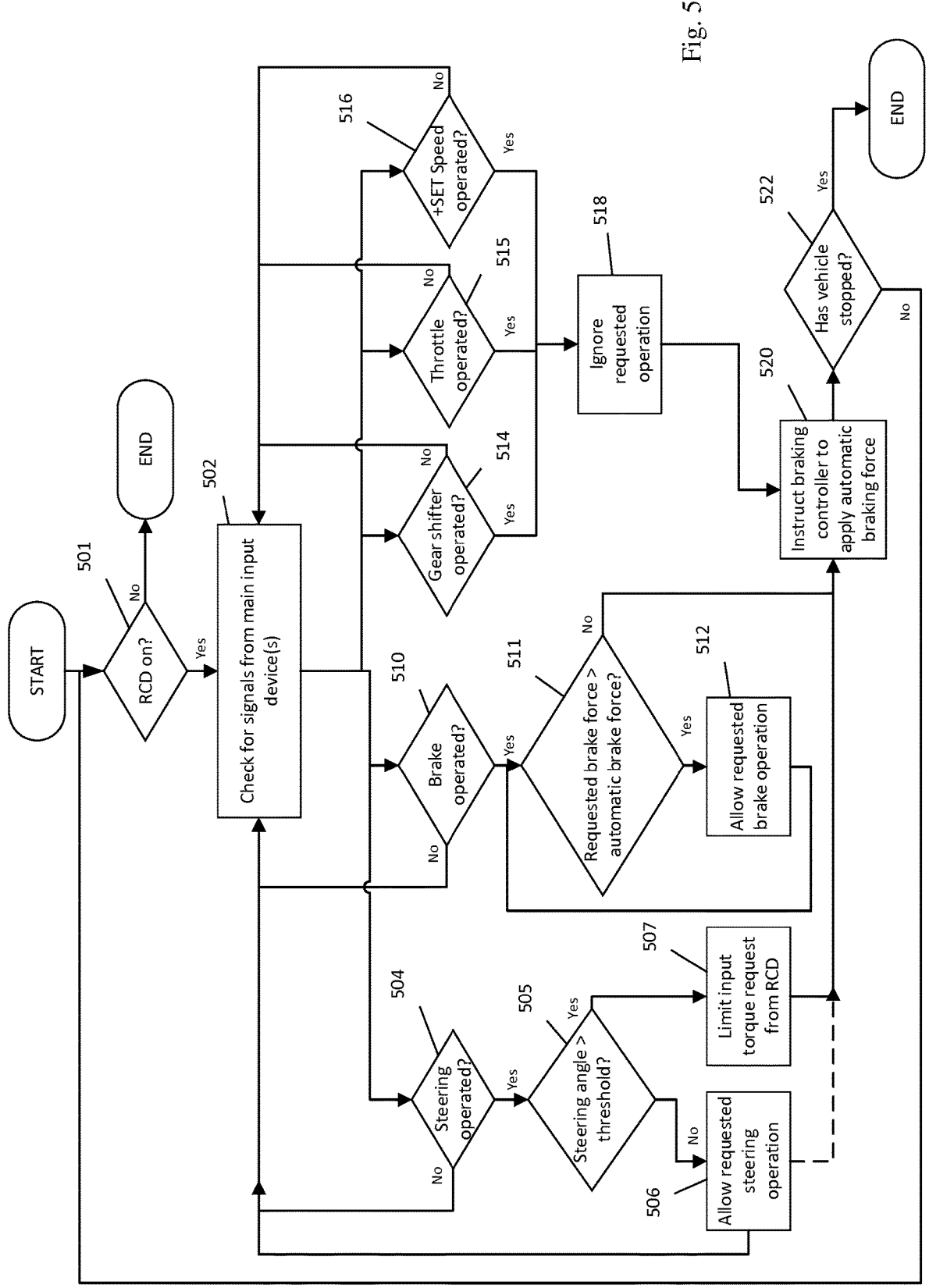
FIG. 5 shows a flowchart of a method of controlling the movement of a vehicle in a remote control mode according to the invention.

An example of a method for controlling the movement of a vehicle with a remote drive system is shown in FIG. 5. A schematic example of a controller for controlling movement of a vehicle is shown in FIG. 3. The controller 10 comprises a processor arranged to perform a method embodying the present invention. A computer program, when executed by the processor, is arranged to perform a method embodying the present invention. The computer program may be stored on a computer-readable medium.

A method 500 of controlling the movement of a vehicle is outlined by the flowchart shown in FIG. 5. At block 501 first signals are received from a receiving means in dependence on the receiving means receiving transmitted signals from a remote control device indicating a requested motion of a vehicle. The first signals may be dependent upon the signal strength of the received transmitted signals.

At block 502 the controller monitors for receipt of second signals from one or more main input devices.

If a second signal corresponding to a steering control request from a steering actuator within the vehicle (e.g. the steering wheel 171) is detected, at block 504, then a determination is made, at block 505, whether the requested steering command is above a predetermined threshold (e.g. greater than a given steering angle, or the torque applied to the steering wheel is >3 Nm). Steering requests below the threshold are permitted, at block 506, such that steering of the vehicle is effected either by an occupant within the vehicle or by a user of the remote controlled device 200, whichever is demanding the greatest steering movement, yet the remote control operation is not terminated and monitoring for second signals from all of the main input devices continues, at block 502. However, if the steering request at the steering wheel is determined, at block 507, to be above the threshold, then any steering torque request from the remote control device 200 is limited (e.g. to 3 Nm effective steering wheel torque), so that an occupant within the vehicle can override any remote controlled steering command, and, at block 520, the remote control mode of operation is terminated and the brake controller 13 applies the automatic braking force to bring the vehicle 100 to a controlled stop, as determined at block 521. Optionally, the remote control operation may be terminated on detection of any input at the steering wheel, as indicated by the dashed line from block 506 to block 520.

Concurrently to determining if a steering input is detected, a determination is made, at block 510 as to whether operation of a main brake input device 161 has occurred. If, as determined at block 511, the braking force requested by the operation of the brake 161 is greater than the braking force to be applied automatically under the instruction of the braking controller 13 due to termination of the remote control drive mode, then the greater braking force requested at the main braking input device is permitted, at block 512. If, however, the braking force requested by the operation of the main brake input device 161 is below that to be applied automatically under the instruction of the braking controller 13 due to termination of the remote control drive mode, then the automatic braking command supersedes that of the main brake input device 161, and the remote control mode of operation is terminated and the brake controller 13 applies the automatic braking force to bring the vehicle 100 to a controlled stop, at block 520.

Concurrently to the above determination as to whether main input devices of the first class are operated, determination is made, at blocks 514, 515 and 516 as to whether a main input device of the second class is operated. Block 514 corresponds to determination of operation of the gear shifter 124S; block 515 corresponds to determination of operation of the throttle 163; and block 516 corresponds to determination of operation of the cruise control set speed increase button 174. When operation of any of these second class of primary controllers is detected, then the requested operation is ignored, at block 518 and the remote control mode of operation is terminated and the brake controller 13 applies the automatic braking force to bring the vehicle 100 to a controlled stop, at block 520.

Blocks 501 to 520 are repeatedly performed until the vehicle is determined, at block 522, to have come to a stop. This permits the vehicle to be steered or the brake further applied while the vehicle is still moving.

In summary, aspects of the invention provide a controller and associated method for ensuring safe operation of a vehicle in a remote control drive mode, disabling the remote control operation and applying the vehicle brakes automatically to bring the vehicle to a stop if any of the main input devices within the vehicle are operated. In some cases, such as with operation of a throttle or a cruise control increase set speed button, the action requested by that operation is prevented from happening. In other cases, such as with operation of a brake pedal or steering wheel, that requested operation may be permitted whilst the vehicle is braked to a stop.

References herein to a block such as a function block are to be understood to include reference to items of vehicle hardware, such as electronic modules, and to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of controlling movement of a vehicle, comprising:
   receiving a first signal indicative of the vehicle being in a remote control drive mode;
   receiving a second signal indicative of operation of a main input device within the vehicle;
   providing at least one output signal for terminating the remote control drive mode and automatically applying a braking force to slow the vehicle to a stop in dependence on said second signal being received while said first signal indicates the vehicle to be in the remote control drive mode;
   while the vehicle is being automatically slowed to the stop, determining whether the second signal is indicative of operation of a main input device of a first class or a second class; and
   while the vehicle is being automatically slowed to the stop, permitting an operation requested by the second signal when the main input device is of the first class and denying an operation requested by the second signal when the main input device is of the second class.

2. The method of claim 1, wherein applying the braking force to slow the vehicle comprises following a predetermined deceleration profile.

3. The method of claim 2, wherein the predetermined deceleration profile comprises a constant rate of deceleration.

4. The method of claim 1, wherein the main input device of the second class comprises a throttle, a gear shifter, a clutch, a steering device or a cruise control increase set speed button.

5. The method of claim 1, wherein the main input device of the first class comprises a steering device, and the operation requested by the second signal is a a steering action.

6. The method of claim 1, wherein the main input device comprises a service brake or an electronic parking brake and wherein a braking action requested by the second signal is permitted if the requested braking force exceeds the braking force that is automatically applied in dependence on the output signal.

7. The method of claim 1, comprising, after the vehicle has been brought to a stop:
applying a parking brake of the vehicle; and
putting a transmission of the vehicle into park mode.

8. A non-transitory storage medium containing a computer program configured to be executed by a processor to perform the method of claim 1.

9. A controller for controlling movement of a vehicle, the controller comprising an electronic processor configured to:
receive a first signal indicative of the vehicle being in a remote control drive mode;
receive a second signal indicative of operation of a main input device within the vehicle;
provide at least one output signal for terminating the remote control drive mode and automatically applying a braking force to slow the vehicle to a stop in dependence on said second signal being received while said first signal indicates the vehicle to be in the remote control drive mode;
while the vehicle is being automatically slowed to the stop, determining whether the second signal is indicative of operation of a main input device of a first class or a second class; and
while the vehicle is being automatically slowed to the stop, permitting an operation requested by the second signal when the main input device is of the first class and denying an operation requested by the second signal when the main input device is of the second class.

10. The controller of claim 9, comprising a brake controller operably connected to the electronic processor, the brake controller being configured to
output said second signal to the electronic processor based upon operation of at least one brake of a service brake and a parking brake, and
responsive to the at least one output signal from the electronic processor, to control operation of brakes of the vehicle to apply said braking force.

11. The controller of claim 9, comprising a steering controller that is configured to output said second signal to the processing means based upon operation of a steering device.

12. The controller of claim 11, wherein the steering device comprises a steering wheel and wherein the steering controller comprises an electric power assisted steering module that is configured to output said second signal in dependence on a predetermined torque having been applied to the steering wheel.

13. The controller of claim 12, wherein the steering controller is configured to limit any requested steering torque from a remote control device to 3 Nm at the steering wheel in dependence on said predetermined torque having been applied to the steering wheel.

14. The controller of claim 9, comprising a transmission controller that is configured to output said second signal to the electronic processor based upon operation of one or more of a gear shifter and a clutch.

15. The controller of claim 9, comprising a powertrain controller that is configured to output said second signal to the electronic processor based upon operation of one or both of a throttle and a cruise control increase set speed button.

16. A vehicle comprising the controller of claim 9.

* * * * *